United States Patent Office 3,447,402
Patented June 3, 1969

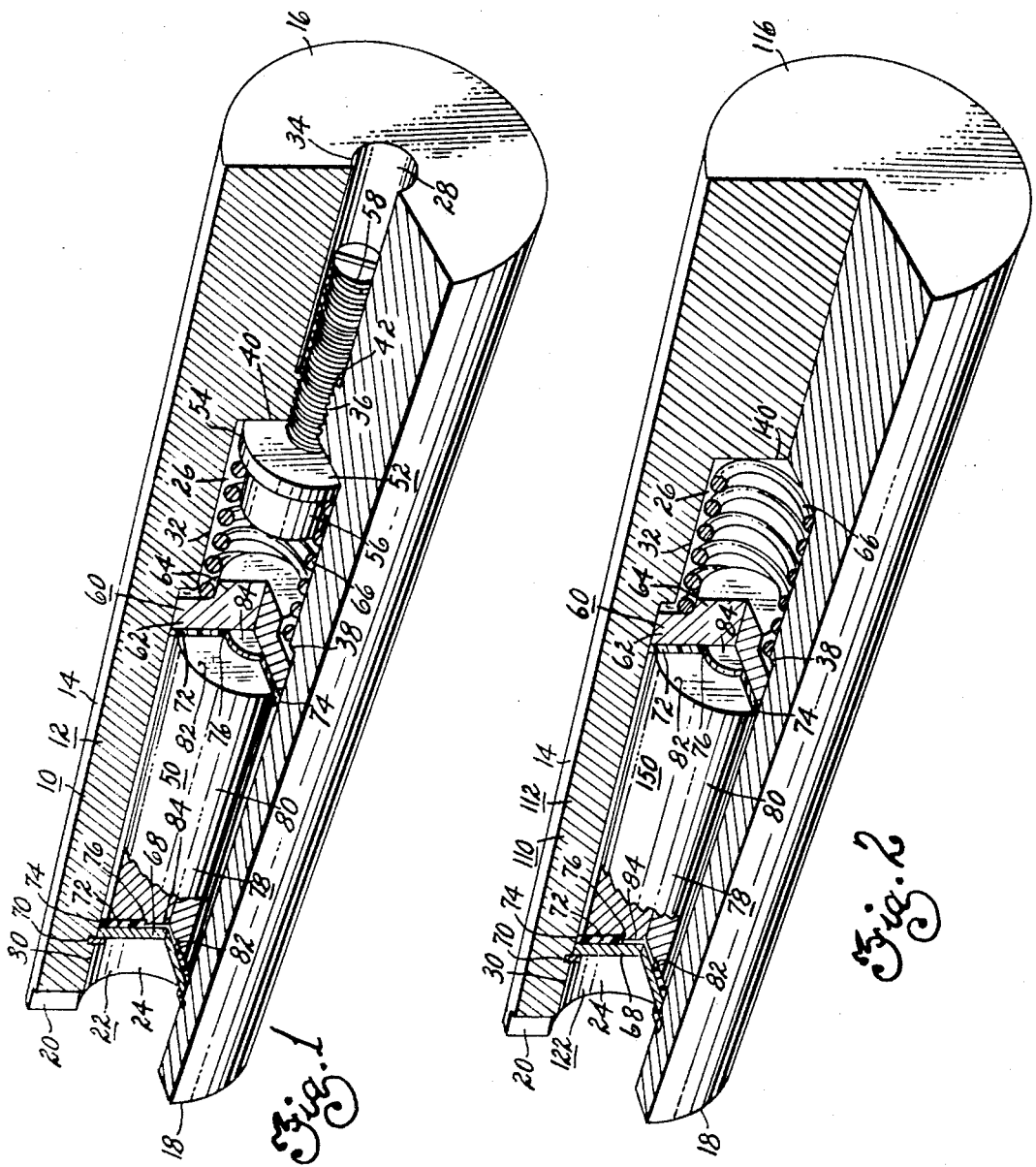

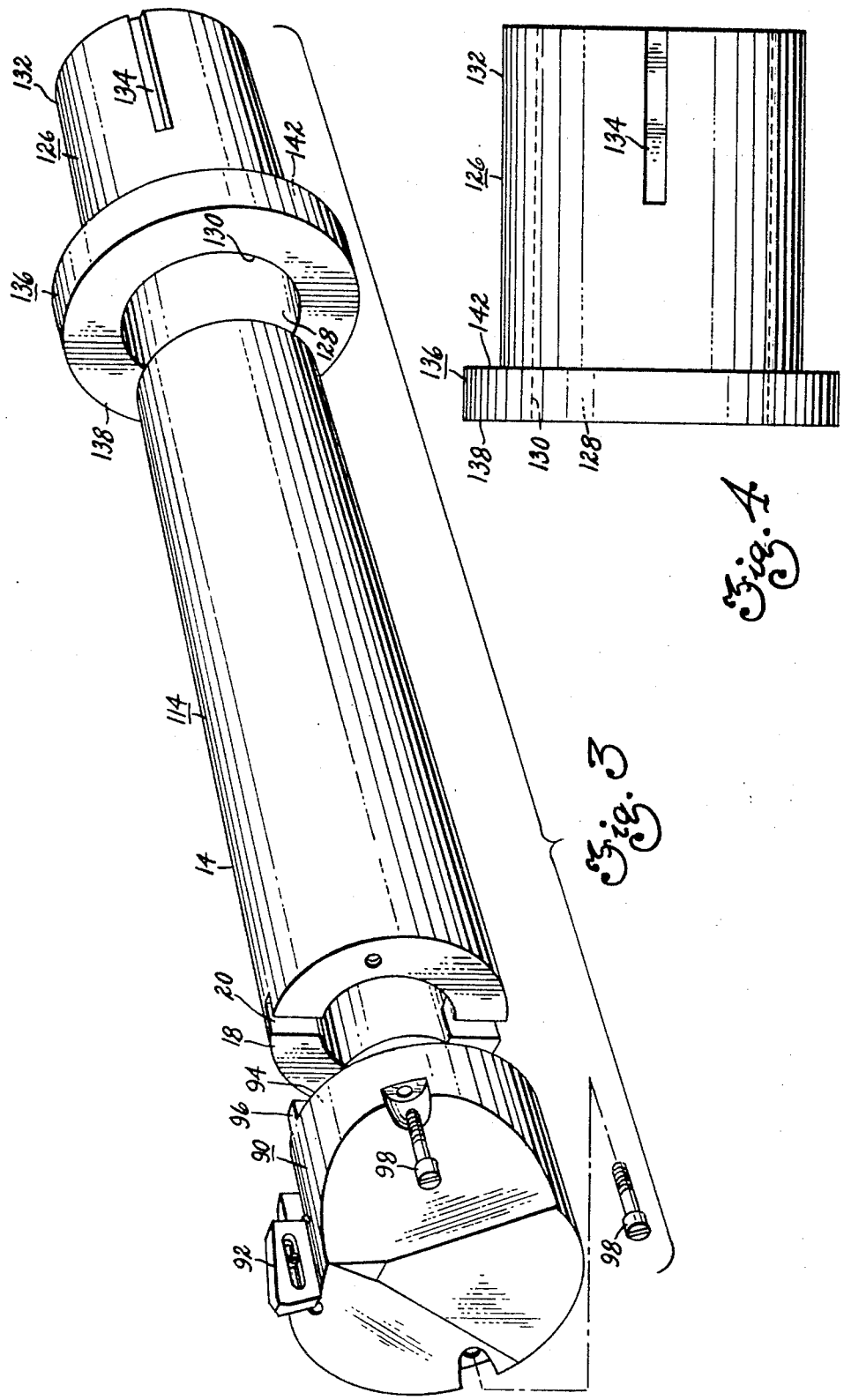

3,447,402
DAMPED TUNED BORING BAR
Joseph C. Ray, Cincinnati, Ohio, assignor to The Cincinnati Milling Machine Co., Cincinnati, Ohio, a corporation of Ohio
Filed Oct. 25, 1967, Ser. No. 678,057
Int. Cl. B23b 29/02
U.S. Cl. 77—58                                14 Claims

ABSTRACT OF THE DISCLOSURE

A machine tool boring bar body assembly of constant length for vibration control, wherein a boring bar body having a central bore contains an internal vibration damper comprising a resilient compression means yieldingly retained between the inner end of the bore and an intermediate abutment means; two viscoelastic absorber elements, which supply both the spring and damping mechanism for the damper, slidably retained between the intermediate and a fixed front abutment means; and a damping mass freely supported and journalled by and between the viscoelastic absorber elements, with the resilient compression means applying a preload on the viscoelastic absorber elements, said preload, as an alternative, being variable by the addition of an adjustable rear abutment means which permits a stiffness variation in the viscoelastic absorber elements thus allowing vibration control adjustment of the boring bar body assembly.

Background of invention

This invention relates to machine tools, particularly to constant length, damped, tuned boring bars used, for example, on turret lathes and although the invention is described with reference to boring bars, it is also applicable to other tools variously utilized in milling, boring and grinding machines as well as any other machines where a cutting tool and the work are rotated relative to each other. Generally the boring bar is held stationary and the boring operation is accomplished by rotating the work past and against the cutting tool mounted on a removable boring head.

Boring bars, by their inherent physical characteristics, have a tendency to cause chatter. Typical applications require boring bars to have a length to diameter ratio ranging from 4:1 to 10:1. This long and slender configuration causes conventional boring bars to have low values of static and dynamic stiffness. The end result is a cutting tool which, due to its tendency to deflect and chatter, is limited to light cuts.

Basically, in order to improve the machining capability of a boring bar, its dynamic stiffness value must be increased. This can be accomplished by increasing the static stiffness and/or the damping in the bar.

If the size and geometric configuration cannot be changed, then the only way to increase the static stiffness is by constructing the bar of some material which has a higher modulus of elasticity. Some manufacturers ave taken this approach and have constructed bars of one of the carbide alloys. The modulus of elasticity of these alloys is two to three times that of steel (60 to $90 \times 10^6$ v. $30 \times 10^6$ p.s.i.). However, the damping ratio of carbide alloys is only one-half to one-third that of steel; thus, the dynamic stiffness (dynamic stiffness=static stiffness x damping ratio) is nearly the same regardless of whether the boring bar is made of steel or carbide. Therefore, the cutting capability is virtually unchanged and there is little to be gained by making the boring bar out of an expensive carbide alloy unless the damping can be increased.

Since the length of the boring bars of this invention remains constant, the natural frequency of the fundamental bending mode, the mode that is responsible for chatter, also remains constant. This characteristic makes an ideal situation for the application of a tuned, damped vibration absorber.

A tuned absorber generally consists of an auxiliary mass or weight that is attached to the main structure by means of a spring and damping element. The values of this weight, spring constant and damping ratio are so adjusted that the natural frequency of this auxiliary system is very near that of the troublesome mode of the main system. If some force is then applied to the main system, which tends to cause it to vibrate, two things happen: (1) the absorber (damper) will vibrate in such a way that at all instances its inertia force is nearly equal and opposite to the applied force; thus, the net force acting on the main system is greatly reduced; and (2) when the absorber is vibrating, some of the energy of this system is absorbed by the damping element. The end result is that the resistance of the main structure to vibration (dynamic stiffness) is increased many times.

Summary of invention

Since the term "boring bar" may or may not include a boring head, mounting adapter means or a damper, the following terms will henceforth be used: (1) boring bar body—which does not include a boring head, mounting adapter means or a damper; (2) boring bar body assembly—which comprises a boring bar body and a damper; and (3) boring bar assembly—which comprises a boring bar body assembly joined with a boring head and a mounting adapter means.

Equipping a steel boring bar body with an internal, tuned, vibration damper leads to a boring bar body assembly which solves previous chatter problems by being able to take very heavy cuts and which is relatively inexpensive to manufacture. When compared to the better fixed length commercial boring bar body assemblies of like dimensions, it is far superior in every respect.

This invention provides a machine tool boring bar assembly incorporating an internal vibration damper, having at least one mode of vibration, composed of a boring bar body having a central bore and an internal vibration damper comprising a fixedly retained front abutment means; a slidably retained intermediate abutment means; a resilient compression means centered and kept in compression between the inner end of the bore and the intermediate abutment means; two viscoelastic absorber elements slidably retained between the front and intermediate abutment means; and a damping mass journalled by and between the viscoelastic absorber elements, with the resilient compression means applying a preload on the viscoelastic absorber elements. As an alternative, the preload applied to the viscoelastic absorber elements may be varied by the addition of an adjustable rear abutment means which permits a stiffness variation in the viscoelastic absorber elements thus allowing vibration control adjustment of the boring bar body assembly.

Other features and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Drawing description

FIG. 1 is a perspective view partially in elevation and partially in section of a machine tool having bar body assembly incorporating an adjustable internal vibration damper.

FIG. 2 is a perspective view also partially in elevation and partially in section of a machine tool boring bar body assembly incorporating an internal vibration damper.

FIG. 3 is an exploded perspective view of a boring bar assembly utilizing the boring bar body assembly of either FIG. 1 or 2 and including a boring head and an adapter means for attaching the boring bar body assembly to a machine tool component.

FIG. 4 is an elevational view of the adapter means shown in FIG. 3.

*Detailed description*

Figure 5:
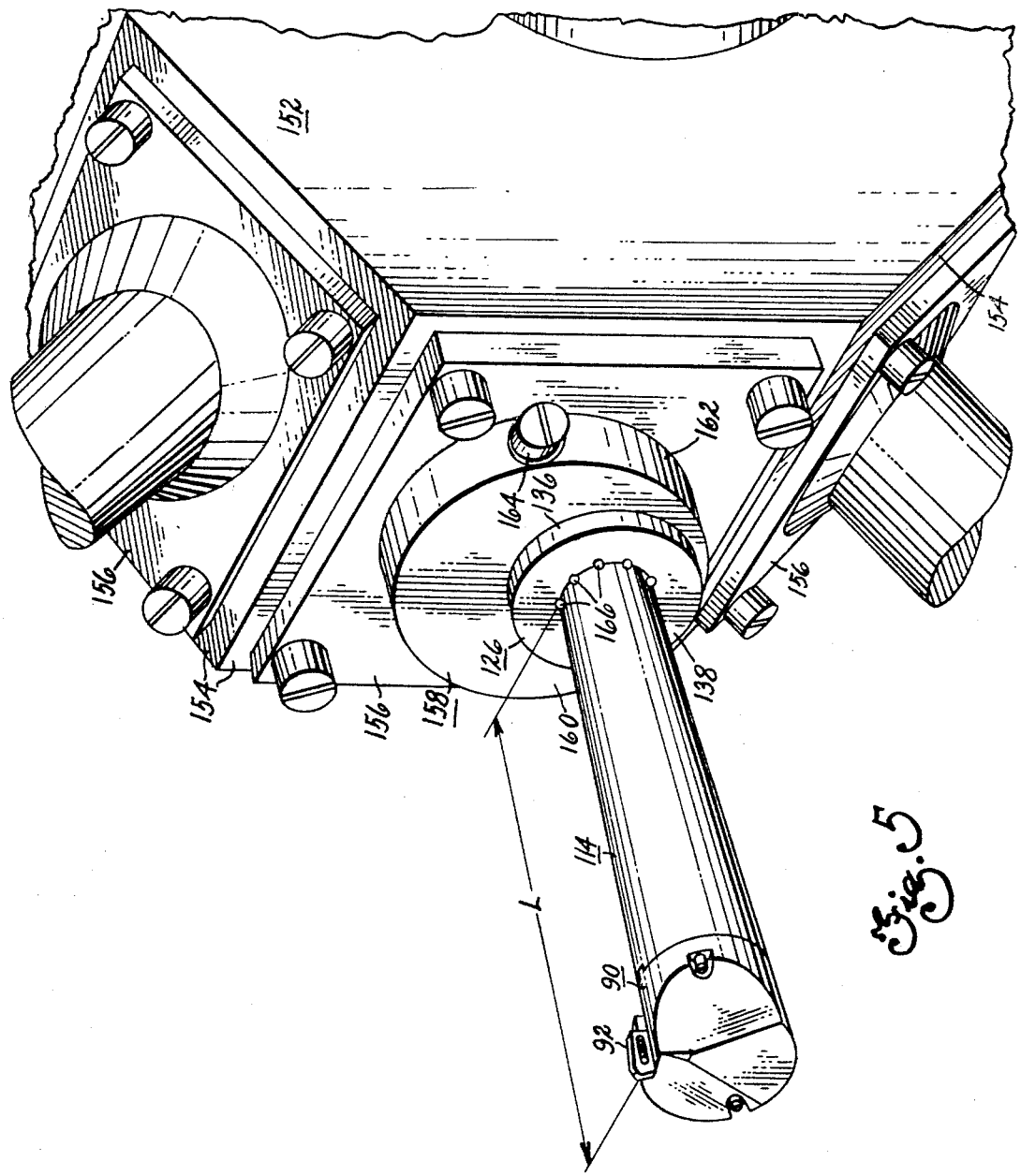
FIG. 5 is a fragmentary perspective view showing the installation of the boring bar assembly of FIG. 3 in a machine tool component.

Referring now to the drawings, FIG. 1 is a perspective view partially in elevation and partially in section of damped machine tool boring bar body assembly 10 composed of circular boring bar body 12 incorporating adjustable internal vibration damper unit 50. Circular boring bar body 12 having outer surface 14, perpendicular rear end surface 16, and perpendicular front end surface 18 with rectangular slot 20, also has central bore 22 comprised of stepped smooth bore portions 24, 26, 28 having peripheral wall surfaces 30, 32, 34 respectively, and internally threaded bore portion 36. Defining the inner ends of bore portions 24, 26, 28 are ring surfaces 38, 40, 42 respectively, all perpendicular to central bore 22, with threaded bore portion 36 being located between surfaces 40 and 42. Located within central bore 22 is adjustable internal vibration damper 50 composed of stepped adjustable rear abutment means 52, having smooth circular portions 54 and 56 in bore portion 26, with integral threaded portion 58, the free end of which is slotted, extending from bore portion 26 through and mating with internally threaded bore portion 36 as well as partially extending into bore portion 28; intermediate abutment means 60, having smooth circular portions 62, 64 with portion 62 in sliding engagement with peripheral wall surface 30 of bore portion 24; resilient compression means 66 yieldingly retained and centered by smooth circular portions 56 and 64; circular disc front-abutment means 68 fixedly retained in bore portion 24 by expanding ring 70 in peripheral wall surface 30; ring-shaped viscoelastic absorber elements 72, located between smooth circular portion 62 and front abutment means 68, having outer peripheral surfaces 74 and inner peripheral surfaces 76, with surfaces 74 in sliding engagement with peripheral wall surface 30; and cylindrical damper mass 78, having outer surface 80, perpendicular end surfaces 82 and concentric circular end portions 84, located between viscoelastic absorber elements 72, with end surfaces 82 abutting viscoelastic absorber elements 72 and circular end portions 84 journalled in inner peripheral surfaces 74 of viscoelastic absorber elements 72. A locking means (not shown), such as a nylon insert, should be provided between threaded bore portion 36 and threaded portion 58.

Thus, as shown in FIG. 1, boring bar body assembly 10 essentially consists of a cylindrical piece of steel 12 with tuned damped absorber 50 mounted internally in the forward section (position of maximum amplitude) thereof, while the rear section is used to house an adjusting or tuning mechanism, i.e. threaded portion 58 of rear abutment means 52. Damper mass 78 which is generally constructed of lead, is supported by and between ring-shaped viscoelastic absorber elements 72 which supply both the spring and damping mechanism for damper unit 50. It is very important that damper mass 78 always remain freely supported by viscoelastic absorber elements 72. Front and intermediate abutment means 68, 60 respectively, which engage viscoelastic absorber elements 72, must be of such a fit that all or nearly all of the motion that takes place within bore 22 is due to damper mass 78 shearing the viscoelastic material. Bore 24, having peripheral wall surface 30 and containing damper mass 78, should be reamed and abutment means 60 and 68 should be ground on their cylindrical outer surfaces.

The diameter of bore 22, machined into boring bar body 12, is somewhat critical since any removal of metal will weaken boring bar body 12. For small diameter bores, the static stiffness of boring bar body 12 drops gradually; however, at a ratio of inner to outer diameter of about 0.6 and larger, the static stiffness begin to drop rapidly. Bore 22 should not be so large that it substantially weakens boring bar body 12, but at the same time, it must be of sufficient size to accommodate a damper mass 78 large enough to obtain the desired amount of improvement in dynamic stiffness. The depth of bore 22 does not greatly affect the static stiffness of boring bar body 12 and even with bore 22 extending completely through boring bar body 12 there results a less than 10% loss in stiffness when compared to that of a partial bore.

FIG. 2 is a perspective view also partially in elevation and partially in section of damped machine tool boring bar body assembly 110 composed of circular boring bar body 112 incorporating internal vibration damper 150. This embodiment and its operation are very similar to that of FIG. 1 except for the deletion of rear adjustable abutment means 52 of FIG. 1, thereby making it non-adjustable. Similar parts of these two embodiments are labelled with the same numerals. Circular boring bar body 112 having outer surface 14, perpendicular rear end surface 116, and perpendicular front end surface 18 with rectangular slot 20, also has central bore 122 comprised of stepped smooth bore portions, 24, 26 having peripheral wall surfaces 30, 32, respectively. Defining the inner ends of bore portions 24, 26 are ring surfaces 38 and circular surface 140 respectively, both perpendicular to central bore 122. Located within central bore 122 is internal vibration damper 150 which is substantially identical both in structure and operation to vibration damper 50 of FIG. 1 except for the deletion in FIG. 2 of adjustable rear abutment means 52, thus causing resilient compression means 66 to be retained and centered on one end by smooth circular portion 64 of intermediate abutment means 60 while the other end abuts circular surface 140 on the inner end of bore 26.

FIG. 3 is an exploded perspective view of a boring bar assembly 114, utilizing either boring bar body assembly 10 of FIG. 1 or boring bar body assembly 110 of FIG. 2, including boring head 90 and adapter means 126, the latter being used for attaching either boring bar body assembly 10 or 110 to a machine tool component. Boring head 90, having cutting tool 92 mounted thereon, has rear end surface 94, having raised rectangular portion 96, abutting and attached by means of screws 98, to front end surface 18 of boring bar body assembly 10 or 110, with rectangular portion 96 fitting into rectangular slot 20. Adapter means 126, also shown in elevation in FIG. 4, is a centrally apertured sleeve having bore 128 with inner peripheral surface 130, outer surface 132 with key-slot recesses 134 and flange 136 having front face 138 and rear face 142. The rear end of boring bar body assembly 10 or 110 is inserted into bore 128 of adapter means 126 so that a portion of boring bar body outer surface 14 is in sliding contact with inner peripheral surface 130. Boring bar body assembly 10 or 110 is inserted into bore 128 so as to occupy at least two-thirds of the total length of bore 128. Thereupon, boring bar 10 or 110 is rigidly attached to adapter means 126, as best shown in FIG. 5, by depositing a plurality of weld beads 166 in the intersection of boring bar body outer surface 14 and flange front face 138. The diameters of boring bar body assembly 10 or 110 and bore 128 of adapter means 126 are very nearly the same thus permitting a tight sliding fit of the former into the latter and resulting in an essentially integral unit after deposition of weld beads 166 (FIG. 5).

FIG. 5 is a fragmentary perspective view showing the installation of boring bar assembly 114 in, for example, turret 152 of a machine tool. Turret 152 has an octagon-shaped peripheral surface with apertured flats 154 and mounted thereon are apertured plates 156 having apertured raised disc portion 158 comprised of annular face 160 and cylindrical side 162. Retaining means 164 extends radially outwardly from cylindrical side 162. Boring bar assembly 114, as shown in FIG. 3, is attached to turret 152 by inserting outer surface 132 of adapter means 126 into apertured disc portion 158 of apertured plate 156 until rear face 142 of flange 136 abuts annular face 160 of disc portion 158. Key-slot recesses 134 mate with internal keys in apertured disc portion 158 thereby preventing rotation of boring bar assembly 114 and retaining means 164 properly secures boring bar assembly 114 against longitudinal movement. Thus, key-slot recesses 134, flange 136 and retaining means 164 cooperate to prevent all movement of boring bar assembly 114 in addition to providing a proper location for cutting tool 92.

Since boring bar body assembly 114 is designed for use on a specific machine, there are certain factors concerning its use which will not hold true for a boring bar assembly which is used on many different machines. One of the most important factors of this invention is that for a specific application, the length of boring bar assembly 114 will always remain constant (i.e., for boring bar assemblies of different lengths, the boring bar body assemblies 10 or 110 and their internal dampers 50 and 150, respectively, must be modified accordingly). As best shown in FIG. 5, the length L of boring bar assembly 114 is defined as the length from front face 138 of flange 136 to the tip of cutting tool 92 in a location axially remote from front face 138. Thus, the length of boring bar body assemblies 10 and 110, boring head 90, tool 92, adapter means 126, as well as the depth of insertion of boring bar assemblies 10 and 110 into adapter means 126, all have to be controlled. Since the length of boring bar assembly 114 remains constant, the natural frequency of the fundamental bending mode, the mode that is responsible for chatter, also remains constant. This characteristic makes an ideal situation for the application of a tuned, damped vibration absorber.

Tuning damper unit 50 or 150 consists of determining viscoelastic absorber elements 72, which in connection with predetermined damper mass 78, produce a natural frequency nearly that of the natural frequency of the fundamental bending mode of the boring bar body alone. Since the size of damper mass 78 is determined by bore diameter and depth, and since the natural frequency of the boring bar body may be computed mathematically or by actual construction, the only other element that needs to be provided is a viscoelastic absorber element material having the correct spring and damping properties. The function of resilient compression means 66, whether it is adjustable as in boring bar body assembly 10 or non-adjustable as in boring bar body assembly 110, is to provide the necessary preloading of viscoelastic absorber elements 72 and to assure proper location of viscoelastic absorber elements 72 and damper mass 78 in central bore 22. Boring bar body assembly 110, by reason of its non-adjustability of resilient compression means 66, is essentially a fixed frequency design because of its constant preloading of viscoelastic absorber elements 72. In boring bar body assembly 10, by reason of its adjustability of resilient compression means 66 by turning threaded portion 58 of adjustable rear abutment means 52, the range from nominal preload to maximum preload of viscoelastic absorber elements 72 permits an up to 25% stiffness variation of viscoelastic absorber elements 72 thus allowing vibration control adjustment.

Instrumentation is needed for the final tuning of boring bar assembly 114 when utilizing boring bar assembly 10 and this is accomplished by exciting boring bar assembly 114 and varying the preload on viscoelastic absorber elements 72 by turning threaded portion 58 of adjustable rear abutment means 26 until the point of minimum response or corresponding maximum dynamic stiffness is determined. Insertion of a suitable resilient compression means 66, i.e. one that will give the proper preload, in boring bar body assembly 110, when it is assembled, precludes further tuning at runoff and allows use immediately upon assembly.

Anything that changes either the natural frequency of boring bar bodies 12 and 112 or the natural frequency of damper units 50 and 150 will affect the performance of boring bar assembly 114. For any given boring bar assembly, its natural frequency can be changed in either of two ways: (1) if the length L of boring bar assembly 114 is changed, and (2) if the manner in which boring bar assembly 114 is retained varies greatly in degrees of rigidity. In the embodiments considered here, neither of these factors will occur since length L of a given boring bar assembly 114 will not change, and key-slot recesses 134, flange 136 and retaining means 164 hold boring bar assembly 114 very rigid. The natural frequency of damper units 50 or 150 is affected by heat and the amount of preload on viscoelastic absorber elements 72. Generally, heat will be no serious problem since boring operations are usually cyclic, thus allowing an adequate period of time for boring bar assembly 114 to cool. If coolant is used, then there is no problem at all. In addition, the internal mounting of damper units 50 and 150 further protects these damper units from heat, dirt and moisture. The preloading of viscoelastic absorber elements 72 is set when boring bar assembly 114 is assembled and is generally not changed thereafter.

The dynamic stiffness of, for example, a 2¼ inch diameter boring bar assembly 114 having a length L of 9 inches, is approximately 30,000 lbs. per in., and cutting with structure having these features shows it is possible to take from 30 to 50% deeper cuts without chatter in comparison to a now commercial carbide alloy boring bar body of similar dimensions equipped with an amplitude dependent damper mechanism, with the cost of the latter being substantially higher.

While the invention has been described in connection with possible forms or embodiments thereof, it is to be understood that the present disclosure is illustrative rather than restrictive and that changes or modifications may be resorted to without departing from the spirit of invention or scope of the claims which follow.

What is claimed is:
1. A machine tool boring bar body assembly incorporating an internal vibration damper, having at least one mode of vibration, comprising:
  (a) a boring bar body having a central bore;
  (b) an internal vibration damper comprising;
    (1) a front abutment means fixedly retained in said bore;
    (2) an intermediate abutment means slidably retained in said bore;
    (3) a resilient compression means centered and kept in compression between the inner end of bore and said intermediate abutment means;
    (4) viscoelastic absorber elements slidably retained in said bore between said front and intermediate abutment means, with said viscoelastic absorber elements providing both optimum damping capacity and stiffness; and
    (5) a damping mass journalled by and between said viscoelastic absorber elements, with said resilient compression means applying a preload on said viscoelastic absorber elements.
2. The machine tool boring bar body assembly of claim 1 including a boring head means, for mounting a cutting tool thereon, attached to the front end of said boring bar body assembly.
3. The machine tool boring bar body assembly of claim 1 including an adapter means, for mounting said boring bar body assembly on a machine tool, attached to the rear portion of said boring bar body assembly.

4. A machine tool boring bar body assembly, including in addition to the machine tool boring bar body assembly of claim 3, a boring head means, for mounting a cutting tool thereon, attached to the front end of said boring bar body assembly.

5. The machine tool boring bar body assembly of claim 1 wherein the viscoelastic absorber elements comprise centrally apertured annular discs, each of which integrally supplies both the spring and damping mechanism for the damper.

6. The machine tool boring bar body assembly of claim 5 wherein the damper mass comprises a cylindrical body with perpendicular end surfaces having axially extending circular end portions, with said end portions being confined in the central apertures of said viscoelastic absorber elements so that said damper mass is freely supported, concentrically and axially, entirely within said boring bar body by said viscoelastic absorber elements.

7. The machine tool boring bar body assembly of claim 1 including an adjustable rear abutment means movably retained in said bore, with said resilient compression means being centered and kept in compression between said intermediate and rear abutment means, whereby adjustment of said rear abutment means varies the amount of compression of said resilient compresison means, thereby varying the preload of said viscoelastic absorber elements and causing a stiffness variation in said viscoelastic absorber elements, thus permitting vibration control adjustment of said boring bar body assembly.

8. The machine tool boring bar body assembly of claim 7 wherein the viscoelastic absorber elements have a predetermined range of inducible stiffness variations.

9. The machine tool boring bar body assembly of claim 8 wherein the range from nominal preload to maximum preload of said viscoelastic absorber elements permits an up to 25% stiffness variation of said viscoelastic absorber elements.

10. The machine tool boring bar body assembly of claim 1 wherein the boring bar body is cylindrical and has a stepped cylindrical bore.

11. The machine tool boring bar body of claim 10 wherein the ratio of the largest inner to outer diameter of the boring bar body preferably is kept from exceeding 0.60.

12. In combination, a machine tool boring bar body with a central bore, having disposed internally thereof, a vibration damper comprising:
 (a) a front abutment means fixedly retained as to said bore;
 (b) an intermediate abutment means slidably retained as to said bore;
 (c) a resilient compression means located between the inner end of said bore and said intermediate abutment means;
 (d) two viscoelastic absorber elements slidably retained between said front and intermediate abutment means, with said viscoelastic absorber elements providing both optimum damping capacity and proper stiffness; and
 (e) a damping mass journalled by and between said viscoelastic absorber elements, with said resilient compression means applying a preload on said viscoelastic absorber elements.

13. The combination of claim 12 wherein said vibration damper is pretuned prior to assembly in a manner such that said resilient compression means, viscoelastic absorber elements and damping mass collectively determine the natural frequency of said vibration damper very near to that of the fundamental bending mode of said boring bar body.

14. The combination of claim 12 wherein said vibration damper includes an adjustable rear abutment means engaging an end of said resilient compression means remote from said intermediate abutment means, whereby adjustment of said rear abutment means varies the amount of compression of said resilient compression means thereby changing the preload and stiffness in said viscoelastic absorber element, thus permitting vibration control adjustment.

References Cited
UNITED STATES PATENTS 2,051,954  12/1968  Le Land _____ 77—58

U.S. Cl. X.R.

GERALD A. DOST, *Primary Examiner.*